US009638076B2

(12) United States Patent
Nitta (10) Patent No.: US 9,638,076 B2
(45) Date of Patent: May 2, 2017

(54) ELECTRIC VEHICLE

(75) Inventors: Takahiro Nitta, Kobe (JP); Hiroko Nitta, legal representative, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 92 days.

(21) Appl. No.: 14/368,496

(22) PCT Filed: Dec. 24, 2011
(Under 37 CFR 1.47)

(86) PCT No.: PCT/JP2011/007243
§ 371 (c)(1),
(2), (4) Date: Oct. 10, 2014

(87) PCT Pub. No.: WO2013/093986
PCT Pub. Date: Jun. 27, 2013

(65) Prior Publication Data
US 2015/0057858 A1    Feb. 26, 2015

(51) Int. Cl.
*B60L 9/00* (2006.01)
*B60L 11/00* (2006.01)
(Continued)

(52) U.S. Cl.
CPC ............... *F01M 1/16* (2013.01); *F01M 1/02* (2013.01); *F16H 57/0439* (2013.01);
(Continued)

(58) Field of Classification Search
CPC .... F01M 1/02; F01M 1/16; F01M 2001/0215; F16H 57/0439; F16H 57/0476; F16H 61/0031; F16H 2061/0037; B60Y 2200/12; B60Y 2200/91; B60Y 2300/18025

USPC .......................................................... 701/22
See application file for complete search history.

(56) References Cited

U.S. PATENT DOCUMENTS

| | | | |
|---|---|---|---|
| 6,716,138 B2* | 4/2004 | Matsubara | F16H 57/0434 477/167 |
| 2006/0120876 A1* | 6/2006 | Kitano | B60K 6/48 417/42 |

(Continued)

FOREIGN PATENT DOCUMENTS

| | | |
|---|---|---|
| JP | 09286245 A | 11/1997 |
| JP | 2001248468 A | 9/2001 |

(Continued)

OTHER PUBLICATIONS

Matsubara et al. JP2002372139_English Translation, Dec. 2002.*
(Continued)

*Primary Examiner* — Jerrah Edwards
*Assistant Examiner* — Rachid Bendidi
(74) *Attorney, Agent, or Firm* — Alleman Hall McCoy Russell & Tuttle LLP (57) ABSTRACT

An electric vehicle such as an electric motorcycle includes a driving motor which activates a wheel via a driving power transmission mechanism (e.g., transmission), a mechanical oil pump which is mechanically activated by the driving motor to feed oil to the driving power transmission mechanism, and an electric oil pump which feeds the oil to the driving power transmission mechanism. A controller causes the electric oil pump to initiate its operation before the driving motor in a deactivated state initiates its operation under a specified condition, thus preventing a situation in which there is no lubrication oil in the driving power transmission mechanism during starting.

9 Claims, 8 Drawing Sheets

(51) Int. Cl.
- G05D 1/00 (2006.01)
- G05D 3/00 (2006.01)
- G06F 7/00 (2006.01)
- G06F 17/00 (2006.01)
- F01M 1/16 (2006.01)
- F01M 1/02 (2006.01)
- F16H 57/04 (2010.01)
- F16H 61/00 (2006.01)

(52) U.S. Cl.
CPC ...... *F16H 61/0031* (2013.01); *B60Y 2200/12* (2013.01); *B60Y 2200/91* (2013.01); *B60Y 2300/18025* (2013.01); *F01M 2001/0215* (2013.01); *F16H 57/0476* (2013.01); *F16H 2061/0037* (2013.01)

(56) References Cited

U.S. PATENT DOCUMENTS

2009/0271079 A1* 10/2009 Kobayashi ............ B60K 6/48 701/51

2011/0082630 A1* 4/2011 Kawaguchi ......... F16H 61/0031 701/58

2011/0166727 A1* 7/2011 Light .................... B60K 6/445 701/22

FOREIGN PATENT DOCUMENTS

| JP | 2002340159 A | 11/2002 |
|---|---|---|
| JP | 2002372139 A | 12/2002 |
| JP | 2007118722 A | 5/2007 |
| JP | 2007182833 A | 7/2007 |
| JP | 2009264545 A | 11/2009 |
| JP | 2010078086 A | 4/2010 |

OTHER PUBLICATIONS

Yoshiharu et al. JP2010078086_English_translation, Apr. 2010.*
Matsui et al. JPH9286245_English Translation, Nov. 1997.*
ISA Japanese Patent Office, International Search Report of PCT/JP2011/007243, Mar. 13, 2012, WIPO, 2 pages.

* cited by examiner

ELECTRIC VEHICLE

TECHNICAL FIELD

The present invention relates to an electric vehicle such as an electric motorcycle including an electric motor as a driving power source, an ATV (all terrain vehicle) including the electric motor as the driving power source, and a hybrid electric vehicle incorporating an engine in addition to the electric motor. Particularly, the present invention relates to an oil feeding system for lubricating a drive system.

BACKGROUND ART

Conventionally, a straddle vehicle such as a motorcycle is provided with an engine and a transmission which are integrated and has a structure to lubricate a transmission gear train using engine oil. For example, an engine of a motorcycle disclosed in Patent Literature 1 includes an oil pump which is mechanically activated by a crankshaft, and oil discharged from this oil pump flows through an oil filter and an oil cooler and then is fed to a main passage in a crankcase. Then, the oil is fed to a valve operating system, a piston, a crank journal, and the like of the engine, through the main passage. The oil is also fed to a transmission via a transmission oil passage.

CITATION LIST

Patent Literature

Patent Literature 1: Japanese Laid-Open Patent Application Publication NO. 2007-182833

SUMMARY OF INVENTION

Technical Problem

In recent years, in view of depletion of petroleum resources and reduction of carbon dioxide, electric vehicles have been developed gradually, and an electric car and a hybrid car including an electric motor for moving its body have been put into practical use. Some of these electric vehicles are able to start only by the driving power generated by the electric motor. In this case, at the same time that the electric motor initiates its operation, the electric vehicle starts. If there is no lubrication oil in the driving power transmission mechanism, because of a long-time stop of the vehicle, the driving power transmission mechanism or the like may be damaged.

The oil pump which is mechanically activated by the driving power from the driving power source for moving the vehicle body, as in the above described conventional example, is also deactivated during the stop of the vehicle. Therefore, during the stop of the vehicle, the oil is not fed to gears or the like of the driving power transmission mechanism. Because of this, at the starting of the vehicle, if maximum torque of the electric motor is transmitted to the driving power transmission mechanism in a state in which an oil film is not formed (there is no lubrication oil) on the gears or the like of the driving power transmission mechanism during a long-time stop, teeth surfaces of the gears which are in mesh are damaged.

In view of the above stated circumstances, an object of the present invention is to devise a structure of an oil feeding source in an electric vehicle to prevent damage to the driving power transmission mechanism which would be caused by a situation in which there is no lubrication oil in the driving power transmission mechanism at the starting of the electric vehicle.

Solution to Problem

To achieve the above object, an electric vehicle of the present invention comprises: an electric motor which activates a wheel via a driving power transmission mechanism to move a vehicle body; a mechanical oil pump which is mechanically activated by the electric motor to feed oil to the driving power transmission mechanism; an electric oil pump which feeds the oil to the driving power transmission mechanism; and a controller which controls the electric oil pump such that the electric oil pump in a deactivated state initiates its operation, before the electric motor in a deactivated state initiates its operation under a specified condition.

In accordance with this configuration, for example, in a case where the operation of the electric motor in the deactivated state is initiated to start the electric vehicle under the specified condition in which it is estimated that there is no lubrication oil in the driving power transmission mechanism, for example, after a long-time stop of the electric vehicle, the operation of the electric oil pump is initiated to feed the oil to the driving power transmission mechanism before the operation of the electric motor is initiated. This makes it possible to prevent a situation in which there is no lubrication oil in the driving power transmission mechanism and thereby the driving power transmission mechanism is damaged, during starting of the electric vehicle after the oil is fed to the driving power transmission mechanism.

In general, the discharge rate of the oil of the mechanical oil pump increases in proportion to its rotational speed. Therefore, during a low-speed rotation of the mechanical oil pump, the oil tends to be fed insufficiently. On the other hand, during a high-speed rotation of the mechanical oil pump, the oil tends to be fed in excess, and a pump drive loss is likely to increase unnecessarily. In light of this, the operation of the electric oil pump is controlled to compensate for such a discharge characteristic of the mechanical oil pump, thereby making it possible to reduce the pump drive loss during the high-speed rotation while preventing a situation in which the oil is fed insufficiently during the low-speed rotation.

For example, the controller may cause the electric oil pump in the deactivated state to initiate its operation at least when a main switch of the electric vehicle is changed from OFF to ON (main switch is turned ON). Specifically, when the rider of the electric vehicle operates the main switch from OFF to ON, there is a possibility that there was a long stop time of the electric vehicle before the ON-operation. At this time, the electric oil pump is preferably operated to feed the oil to the driving power transmission mechanism.

On the other hand, in a case where the electric motor for moving the vehicle body is deactivated for a predetermined period (e.g., about 5 to 10 minutes) in a state in which the main switch is not OFF, for example, the main switch remains ON, the electric oil pump in the deactivated state may initiate its operation such that the electric oil pump is operated intermittently for a set time (e.g., about 10 to 30 seconds). Or, in a case where the electric motor for moving the vehicle body is deactivated for the predetermined period, the operation of the electric oil pump may be initiated in response to a specified operation performed by a rider to start the electric vehicle, for example, a clutch operation or a gear change (gear shift) operation, which occurs after the electric motor is deactivated.

This makes it possible to prevent a situation in which there is no lubrication oil in the driving power transmission mechanism during starting of the electric vehicle, even after the electric vehicle is left for some time without the rider's operation for turning OFF the main switch or the rider forgot to turn OFF the main switch. The predetermined period may be determined based on a passage of time, or based on an outside air temperature or an oil temperature instead of or in addition to the passage of time.

In a case where the electric vehicle includes the mechanical oil pump and the electric oil pump as an oil feeding source as described above, an oil discharge port of the mechanical oil pump and an oil discharge port of the electric oil pump may be connected to a common oil feeding passage used for feeding the oil to the driving power transmission mechanism. This can simplify an oil passage structure and reduce the number of steps.

The electric vehicle may comprise a cooling oil feeding passage which branches from the common oil feeding passage and is used for feeding the oil to the electric motor and an electric drive circuit of the electric motor to cool the electric motor and the electric drive circuit. This allows the electric motor and the electric drive circuit (inverter) thereof to be cooled by using the oil for lubricating the driving power transmission mechanism. In this case, an oil cooler may be provided in the cooling oil feeding passage.

In a case where the oil is used for cooling the electric motor and the like, the controller may control the electric oil pump such that the electric oil pump operates for a predetermined period after the electric motor for moving the vehicle body is deactivated under a specified condition. Specifically, for example, when the electric motor and the electric drive circuit (inverter) are in an excess heat state just after driving under a high load, the electric oil pump is operated to cool the electric motor and the electric driver circuit, for a certain period after the electric vehicle is stopped.

Advantageous Effects of Invention

In accordance with the present invention, the electric vehicle includes the electric oil pump in addition to the mechanical oil pump and the electric oil pump is operated before starting of the electric vehicle as necessary, thereby making it possible to prevent a situation in which there is no lubrication oil in the driving power transmission mechanism and thereby the driving power transmission mechanism is damaged. In addition, by controlling the operation of the electric oil pump, it becomes possible to avoid a situation in which the oil is fed insufficiently during the low-speed rotation of the mechanical oil pump, and to reduce a pump drive loss during the high-speed rotation of the mechanical oil pump.

DESCRIPTION OF EMBODIMENTS

Hereinafter, an embodiment of the present invention will be described with reference to the accompanying drawings. The directions stated below are referenced from the perspective of a rider riding in an electric motorcycle according to the embodiment. Throughout the drawings, the same or corresponding components in description below are designated by the same reference symbols and will not be described in detail in repetition.

Overall Construction of Electric Motorcycle

Figure 1:
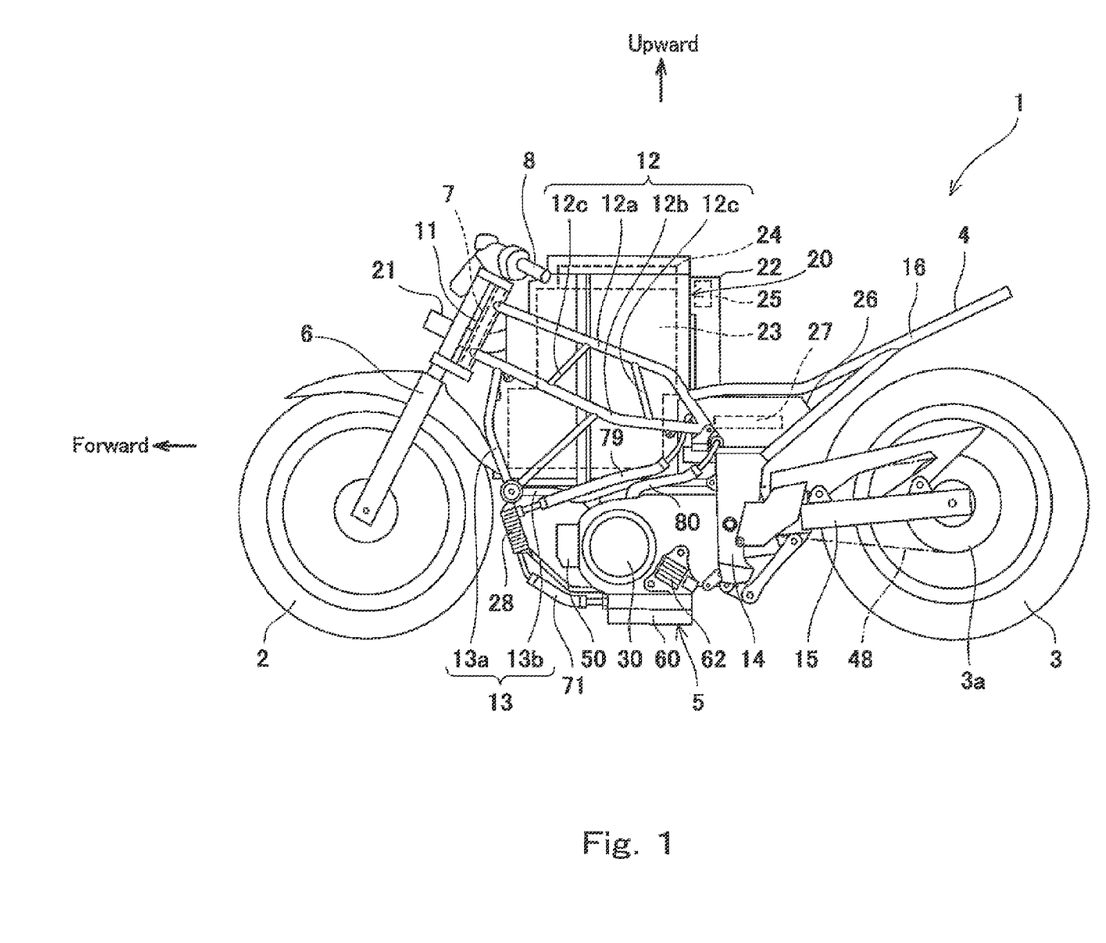
FIG. 1 is a left side view of an electric motorcycle which is an exemplary electric vehicle according to an embodiment of the present invention.

FIG. 1 is a left side view of an electric motorcycle 1 which is an exemplary straddle electric vehicle according to an embodiment of the present invention. As shown in FIG. 1, the electric motorcycle 1 includes a front wheel 2 which is a driven wheel, a rear wheel 3 which is a drive wheel, a vehicle body frame 4 which is disposed between the front wheel 2 and the rear wheel 3, and a motor unit 5 mounted to the vehicle body frame 4. The electric motorcycle 1 is not equipped with an internal combustion engine and is configured to rotate the rear wheel 3 by driving power generated by an electric motor (hereinafter will be referred to as driving motor) 30 for moving a vehicle body.

The front wheel 2 is rotatably mounted to the lower portion of a front fork 6 extending substantially vertically such that it is inclined at a certain caster angle. A steering shaft 7 is coupled to the upper portion of the front fork 6, and a bar-type handle 8 is attached to the upper portion of the steering shaft 7. A right grip of the handle 8 is an accelerator grip (not shown) which is operated by the rider to adjust the driving power generated by the electric motor 30.

The vehicle body frame 4 includes a head pipe 11, a pair of right and left and a pair of upper and lower main frames 12, a pair of right and left down frames 13, a pair of right and left pivot frames 14, a pair of right and left swing arms 15, and a seat frame 16. The head pipe 11 supports the steering shaft 7 such that the steering shaft 7 is rotatable.

The main frame 12 includes a pair of right and left upper main frame members 12a, a pair of right and left lower main frame members 12b, and truss frame members 12c coupling the upper main frame members 12a to the lower main frame members 12b. The upper main frame members 12a extend substantially in parallel with the lower main frame members 12b, respectively. The upper main frame members 12a and the lower main frame members 12b extend rearward from the head pipe 11 such that they are inclined slightly downward. Each of the upper main frame members 12a is bent substantially downward at its rear end portion and joined to the corresponding lower main frame member 12b to form a unitary member. Each of the truss frame members 12c couples the upper main frame member 12a to the lower main frame member 12b in a location which is forward relative to a point where the upper main frame member 12a and the lower main frame member 12b are joined together. This structure can improve a stiffness of the overall main frames 12.

Each of the down frames 13 includes a vertical frame member 13a extending substantially downward when viewed from the head pipe 11, and a lower frame member 13b extending substantially horizontally and rearward from the lower end of the vertical frame member 13a. Each of the pivot frames 14 is coupled to the rear end portion of the main frame 12 and the rear end portion of the lower frame member 13b. The swing arms 15 extend substantially in a forward or rearward direction. Each of the swing arms 15 is pivotally coupled at its front end portion to the pivot frame 14, and supports the rear wheel 3 by its rear end portion such that the rear wheel 3 is rotatable. The seat frame 16 extends rearward such that it is inclined slightly upward, from the rear end portions of the upper main frame members 12a and the upper end portions of the pivot frames 14. The seat frame 16 supports a seat (not shown) on which the rider and a passenger are seated in the forward or rearward direction.

The rider straddling the seat grabs the grips of the handle 8 with hands, bends right and left legs so that the rider's feet are put on steps (not shown), respectively, and sandwiches the rear upper portion of the battery case 20 located immediately in front of the seat (knee grip), although this is not shown. To allow the rider to easily grip the battery case 20 with the knees, the dimension of the rear upper portion of the battery case 20 in the rightward or leftward direction is made smaller than the dimension of the lower portion of the battery case 20 in the rightward or leftward direction.

The battery case 20 is placed between the right and left main frames 12 such that it is surrounded by these main frames 12 and the lower surface of the battery case 20 is located a little above the lower frame members 13b. The battery case 20 is placed between the pair of right and left main frames 12 such that it does not overlap with the main frames 12 when viewed from above. The right and left walls of the battery case 20 are fastened to the main frames 12 by bolts or the like. Therefore, by inserting the battery case 20 into a space between the main frames 12, from above or from below, the battery case 20 can be mounted to the vehicle body frame 4.

An air-intake duct 21 is coupled to the front surface of the battery case 20 and extends forward. An air discharge duct 22 is coupled to the upper portion of the rear surface of the battery case 20 and extends downward. By providing these ducts 21, 22, ram air from the forward direction is taken into the air-intake duct 21, and a battery unit 23 and electric components 24 inside the battery case 20 can be cooled effectively by the air.

An air-intake port at the front end of the air-intake duct 21 protrudes forward farther than the front fork 6 when viewed from a side. This makes it possible to prevent a situation in which rain water and mud splashed up by the wheels 2, 3 enter the air-intake duct 21 through the air-intake port. In addition, an exhaust fan 25 is placed in the vicinity of the upper end of the air discharge duct 22 to discharge the air from the interior of the battery case 20, which can reduce a possibility that the rain water or the like enters the interior of the battery case 20 via the air discharge duct 22.

In a substantially triangular space which is surrounded by the main frame 12, the pivot frame 14 and the seat frame 16, when viewed from a side, behind the lower portion of the battery case 20, an inverter case 26 is placed. An inverter 27 incorporating power semiconductor elements such as IGBT (insulated-gate bipolar transistor) is stored in the inverter case 26. The inverter 27 is connected to the battery unit 23 inside the battery case 20 by means of electric wires or the like.

As described above, the motor unit 5 is placed in a space below the battery case 20, i.e., below the down frames 13 and in front of the pivot frames 14. As will be described in detail later, a driving motor 30 is stored in the front portion of the motor unit 5 and a transmission 40 (driving power transmission mechanism) is stored in the rear portion of the motor unit 5. The right and left portions of the rear portion of the motor unit 5 are fastened to the pivot frames 14, respectively, while the right and left portions of the front portion of the motor unit 5 are fastened to the lower frame members 13b of the down frames 13, respectively.

A terminal block 50 of the electric wire is provided on the front portion of the motor unit 5 such that the terminal block 50 protrudes forward. An oil cooler 28 is placed in front of and away from the terminal block 50. The upper portion of the oil cooler 28 is attached to the front end of the lower frame member 13b. The lower portion of the oil cooler 28 is mounted to the front portion of the motor unit 5 via a stay 29 (see FIG. 3). The oil cooler 28 is configured to cause the oil used for lubricating and cooling the motor unit 5 or the like to radiate heat by heat exchange with the ram air.

Details will be described later with reference to FIGS. 3 to 6. In brief, the lower portion of the motor unit 5 is provided with an oil pan 60, and the oil reserved in the oil pan 60 is suctioned up by an electric oil pump 62 or the like and fed to bearings 33 of a motor shaft 32 of the driving motor 30, and a gear train 45 or the like of the transmission 40, to lubricate them. A part of the oil is sent to the oil cooler 28 via a lower hose 71 and exchanges heat with the ram air flowing through the oil cooler 28.

After the oil has radiated heat, the oil with a lowered temperature is sent to the inverter case 26 via an upper hose 79 connected to the upper portion of the oil cooler 28. A cooler (not shown) having an oil passage with a labyrinthine shape is built into the inverter case 26 such that the cooler is in contact with the inverter 27. While flowing through the cooler, the oil removes the heat from the inverter 27 and is returned to the motor unit 5 via a return hose 80. As will be described later, the oil cools the driving motor 30 in the motor unit 5, and then flows downward to the oil pan 60.

In the present embodiment, the driving motor 30 is a motor/generator which is capable of performing a motor operation and a power generation operation. The driving motor 30 operates as the motor by the electric power supplied from the battery 24 via the inverter 27 and outputs driving power to the rear wheel 3. During regenerative braking of the electric motorcycle 1, the driving motor 30 operates as the electric generator which generates AC power. The inverter 27 converters the AC power into DC power to be charged into the battery 24. The control associated with the operation of the driving motor 30 and the control for charging and discharging the battery 24 is performed by a conventional known method.

Configuration of Motor Unit

Figure 2:
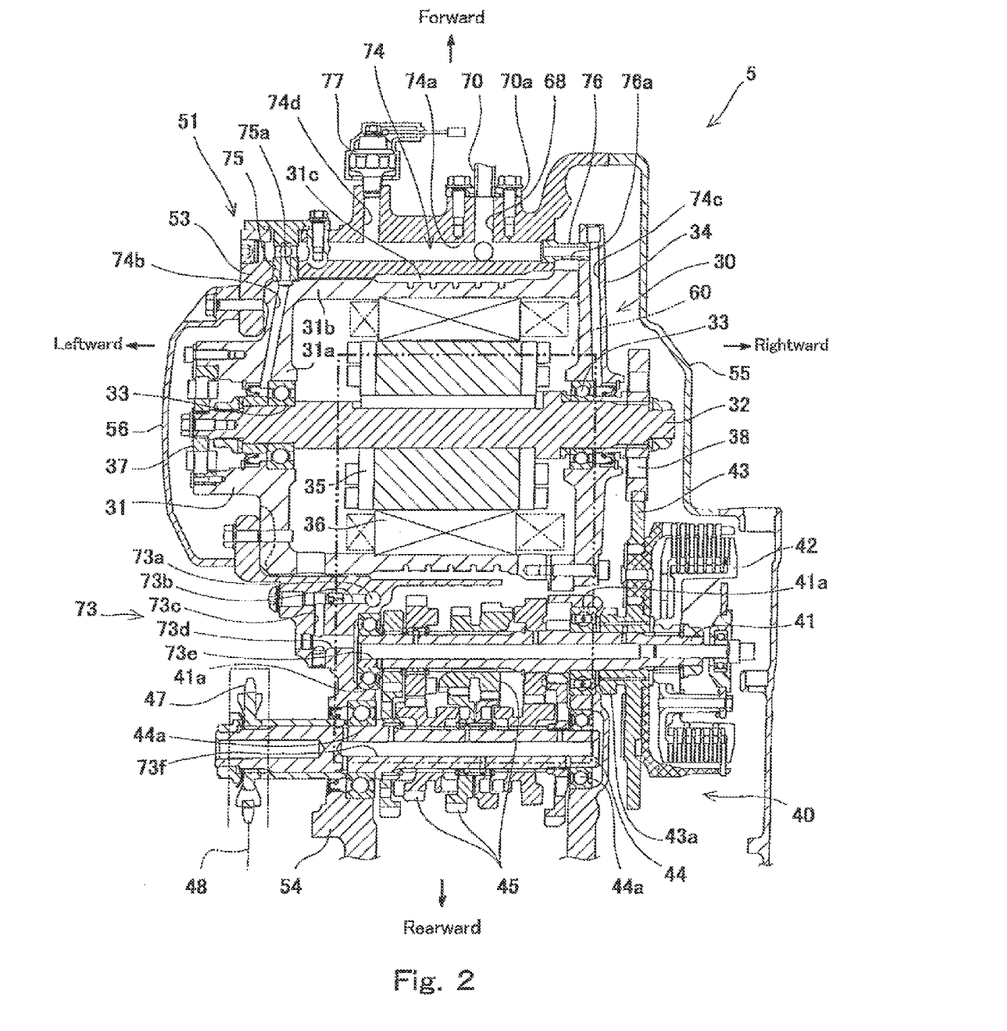
FIG. 2 is a development view showing a schematic structure of a driving motor and a transmission of a motor unit.
Figure 3:
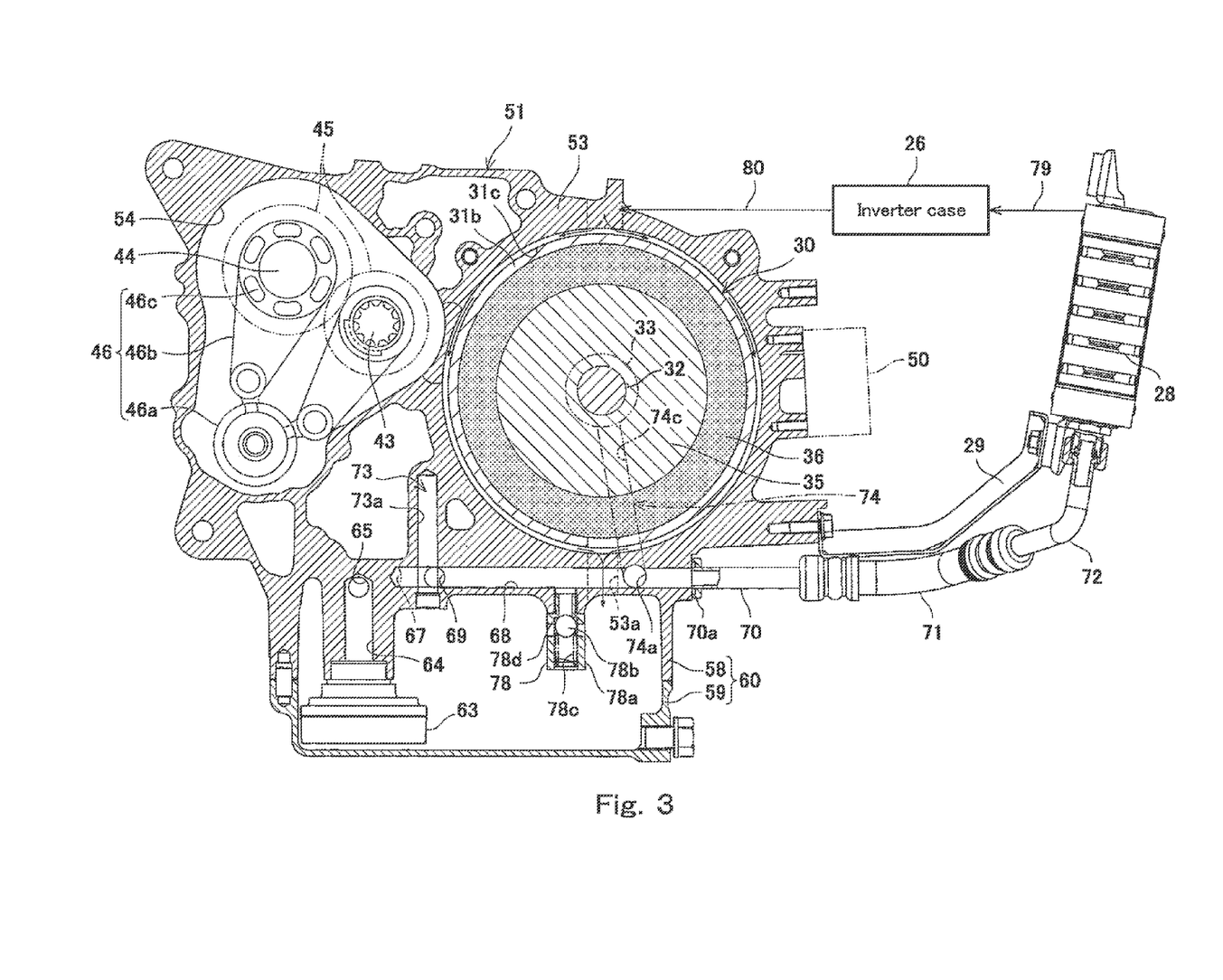
FIG. 3 is a cross-sectional view mainly showing a structure of an oil passage when the motor unit is viewed from a right side.

FIG. 2 is a development view showing a schematic structure of the driving motor 30 and the transmission 40 of the motor unit 5. FIG. 3 is a cross-sectional view of the motor unit 5 showing a structure of the oil feeding system when viewed from a right side of the electric motorcycle 1.

As can be seen from FIG. 2, a case 51 of the motor unit 5 includes a motor storage section 53 and a transmission storage section 54 (transmission mechanism storage section) which open rightward such that the motor storage section 53 and the transmission storage section 54 are connected together in the forward or rearward direction. A right wall member 55 which is separate from the motor storage section 53 and the transmission storage section 54 is provided to close the right opening of the motor storage section 53 and the right opening of the transmission storage section 54.

The motor storage section 53 has a substantially bottomed cylinder shape. A cylindrical case 31 of the driving motor 30 is stored in the motor storage section 53 in a state in which the case 31 is fitted therein through the right opening. The motor shaft 32 (output shaft) extends in a rightward or leftward direction along the axis of the cylindrical case 31. The motor shaft 32 is supported by the bearings 33 (bearings of output shaft) at right and left sides thereof. The left bearing 33 is fitted into a through-hole of a bottom wall portion 31a at the left end of the motor case 31. The right bearing 33 is fitted into a through-hole of a cap 34 for closing the opening at the right end of the motor case 31.

The pair of bearings 33 are mounted on the bottom wall portion 31a which is the walls at both ends of the cylindrical motor case 31 in the axial direction thereof, and the cap 34, respectively. A rotor 35 is mounted to the motor shaft 32 in an intermediate location between the bearings 33 such that the rotor 35 is rotatable together with the motor shaft 32. Although not shown, permanent magnets are embedded in a core of the rotor 35. A ring-shaped stator 36 is placed in close proximity to the rotor 35 so as to surround the outer periphery of the rotor 35. A cooling jacket 31c is formed in a gap between a peripheral wall 31b of the motor case 31 and the motor storage section 53 such that the cooling jacket 31c surrounds the stator 36 (this will be described later).

The left end of the motor shaft 32 penetrates the bottom wall portion 31a of the motor case 31 and protrudes leftward. A rotational angle sensor 37 is attached to the tip end portion of the motor shaft 32. In the present embodiment, a boss section protrudes from the bottom wall portion 31a of the motor case 31 such that the boss section surrounds the left end portion of the motor shaft 32 penetrating the bottom wall portion 31a. The boss section is provided with a pick-up section of the rotational angle sensor 37. A lid member 56 is attached to the left end of the motor storage section 53 so as to cover the rotational angle sensor 37.

The right end of the motor shaft 32 penetrates the cap 34 and protrudes rightward. An output gear 38 is mounted on the tip end portion of the motor shaft 32 by spline or the like. As shown in FIG. 3, a clutch shaft 41 which is an input shaft of the transmission 40 is placed behind the driving motor 30. A clutch gear 43 is rotatably externally fitted to a portion of the clutch shaft 41 which is closer to its right end and is in mesh with an output gear 38 of the motor shaft 32. The clutch gear 43 is coupled to a multiplate clutch 42 (not shown in FIG. 3), which is adjacent to the clutch gear 43. In a state in which the clutch gear 43 and the clutch shaft 41 are connected to each other via the multiplate clutch 42, the rotation of the motor shaft 32 is transmitted to the clutch shaft 41.

An output shaft 44 of the transmission 40 is placed behind the clutch shaft 41. The output shaft 44 and the clutch shaft 41 are connected to each other via the gear train 45 such that the rotation with a changed speed can be output. As shown in FIG. 3, a transmission operation mechanism 46 including a shift drum 46a, a shift fork 46b, a dog clutch 46c, etc. changes a combination of gears connected to each other in the gear train 45. This makes it possible to change a change gear ratio (transmission gear ratio) between an input rotation and an output rotation, i.e., a gear position of the transmission 40.

As shown in FIG. 2, a sprocket 47 is attached to the left end of the output shaft 44 from which the rotation with the changed speed is output. A chain 48 (indicated by virtual line) is wrapped around the sprocket 47 and a sprocket 3a of the rear wheel 3 shown in FIG. 1. The driving power transmission mechanism for driving the driving power of the driving motor 30 is not limited to the above described multi-stage transmission 40 and may be, for example, a belt-type gearless transmission, or a reduction gear mechanism in which its change gear ratio is constant.

As shown in FIG. 2, the transmission storage section 54 for storing the above described transmission 40 has a smaller width in the rightward or leftward direction than the motor storage section 53. The oil pan 60 of a rectangular shape with a relatively small width is provided (indicated by a virtual line in FIG. 2) at the lower portion of the case 51 of the motor unit 5 such that the width of the oil pan 60 substantially conforms to the width of the transmission storage section 54. The oil pan 60 has a rectangular shape which is elongated in the forward or rearward direction such that the rear portion of the oil pan 60 is located below the transmission storage section 54, and the front portion thereof is located below the motor storage section 53. The rotor 35 and the stator 36 of the driving motor 30 are placed rightward relative to the center of the motor storage section 53 in the rightward or leftward direction such that the rotor 35 and the stator 36 are within a range of the oil pan 60 in the rightward or leftward direction.

Oil Feeding System of Motor Unit

Figure 4:
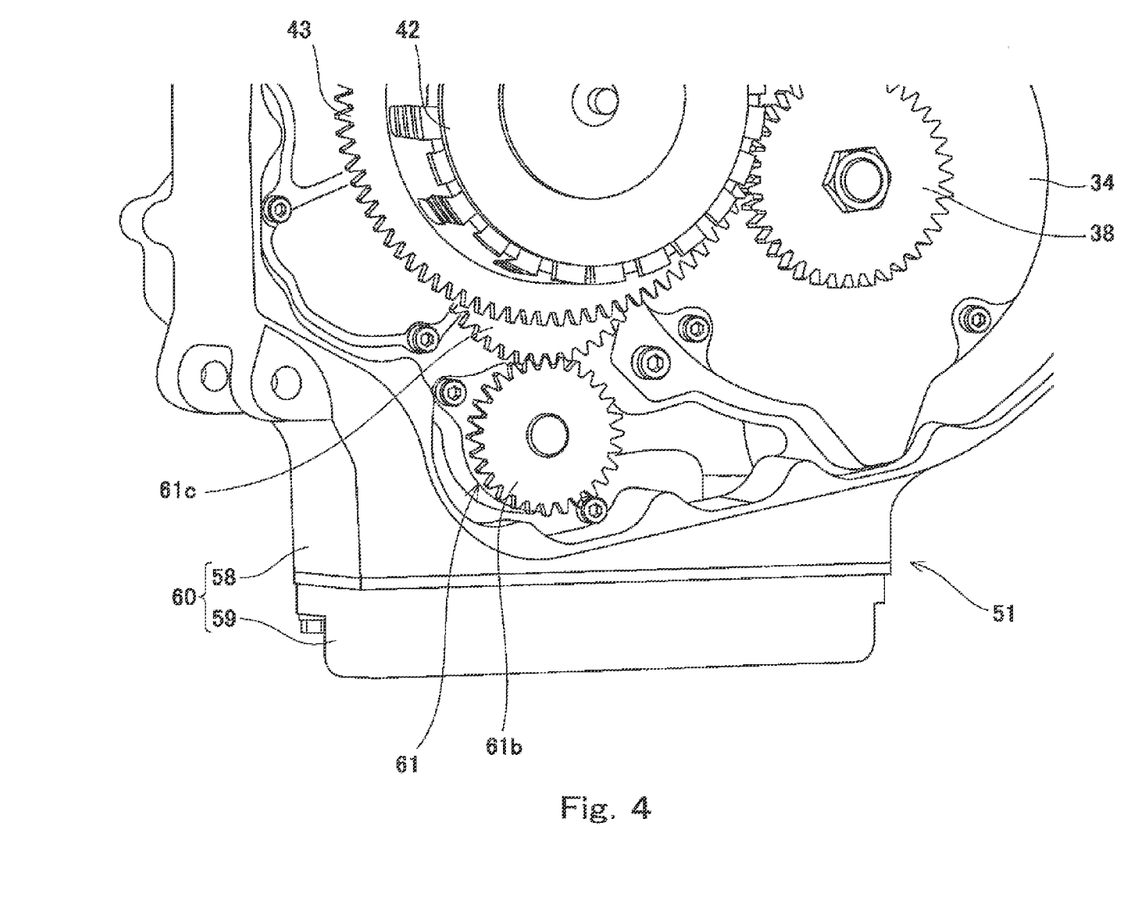
FIG. 4 is a perspective view showing a mechanical oil pump when the motor unit is viewed from a right side.
Figure 5:
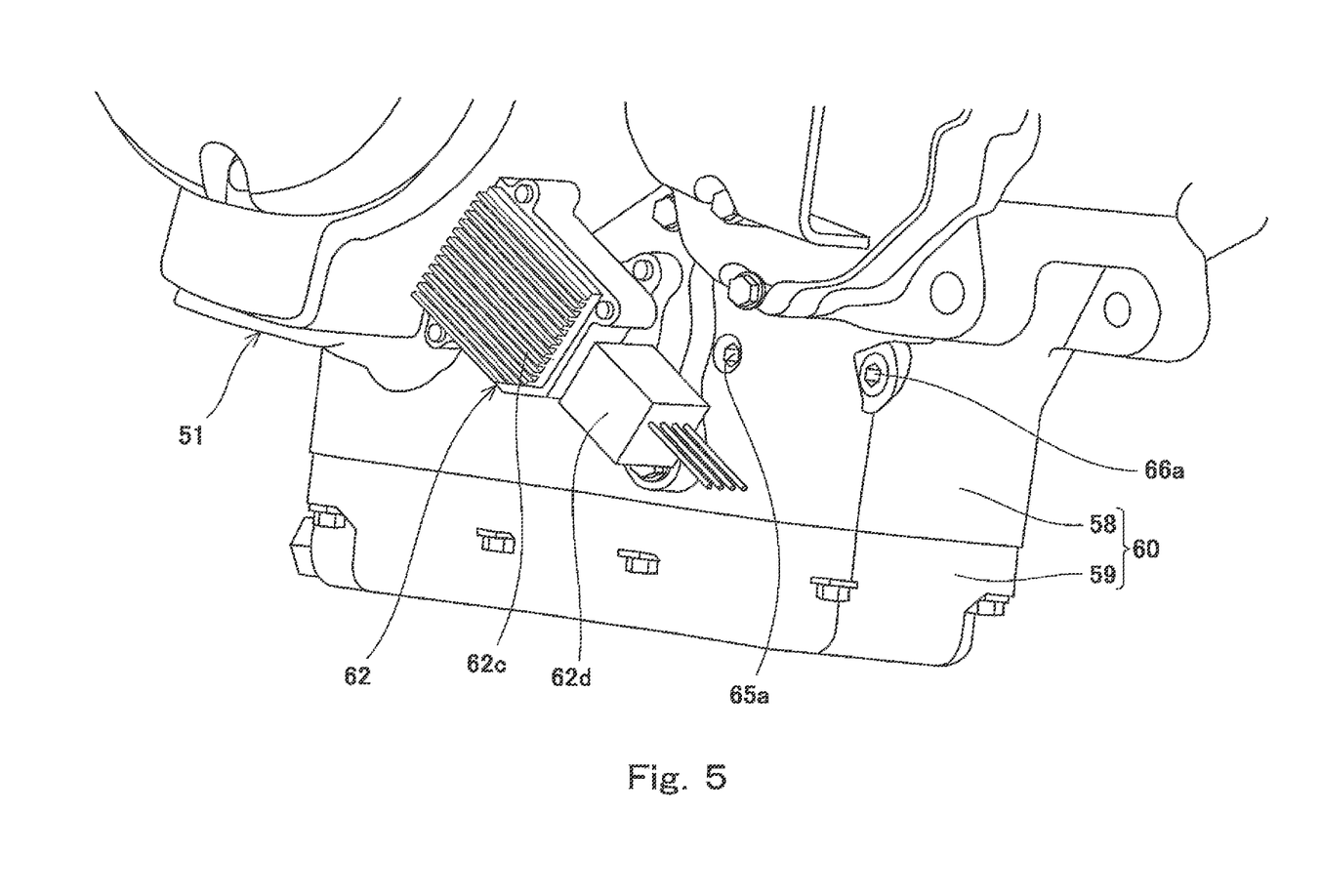
FIG. 5 is a perspective view showing an electric oil pump when the motor unit is viewed from a left side.
Figure 6:
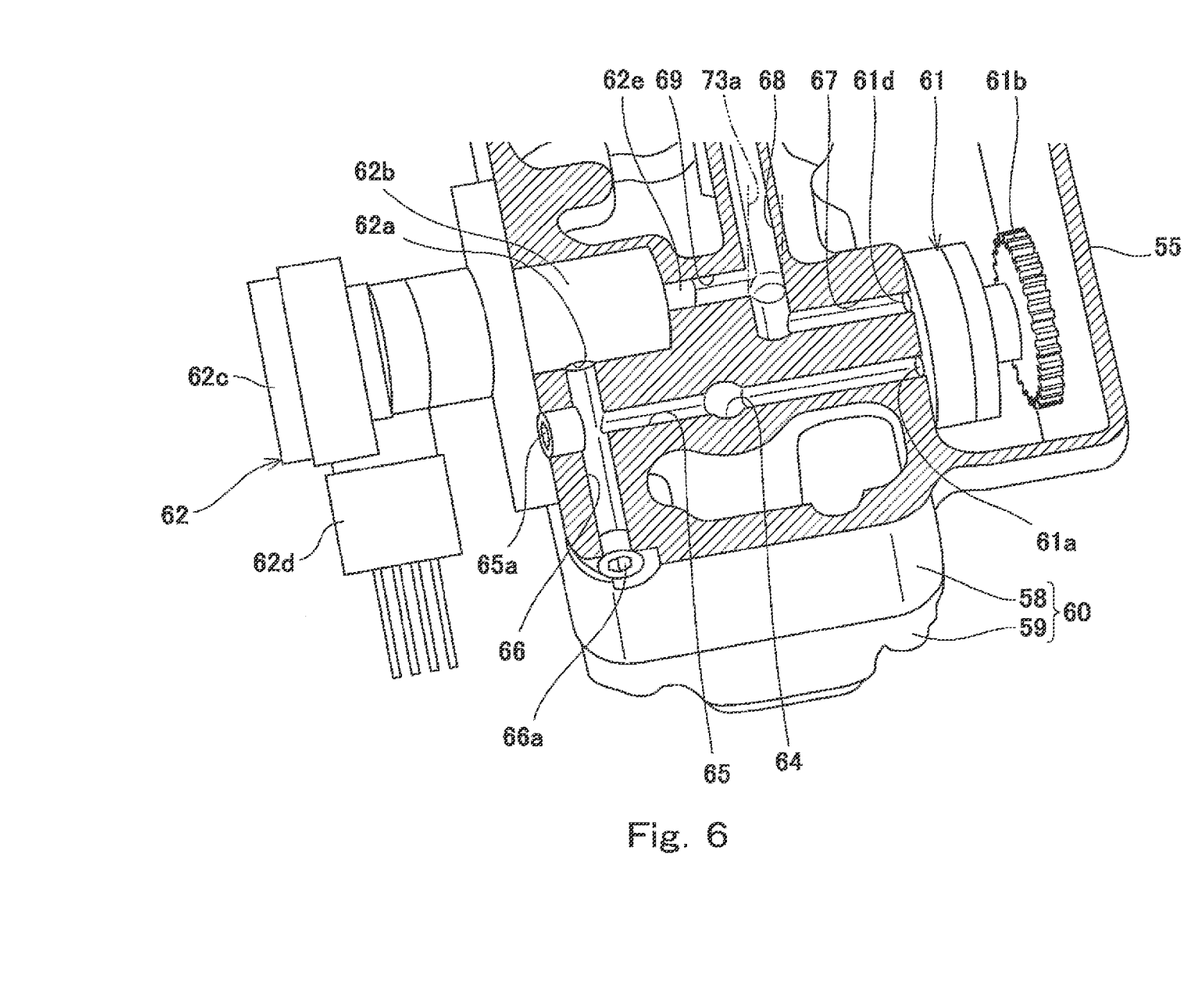
FIG. 6 is a perspective view showing a structure of an oil passage to which two oil pumps are connected, a part of which is shown in cross-section.

Next, an oil feeding system for lubricating and cooling the motor unit 5 will be described with reference to FIGS. 4 to 6, in addition to FIG. 3 as descried above. FIG. 4 shows a mechanical oil pump 61 activated by the driving motor 30 when viewed from a right side, like FIG. 3. FIG. 5 shows an electric oil pump 62 which contains therein a dedicated electric motor (not shown), when viewed from a left side. FIG. 6 shows a structure of an oil passage to which the two oil pumps 61, 62 are connected.

As shown in FIGS. 3 and 6, the lower portion of the case 51 of the motor unit 5 is provided with an oil pan section 58 of a rectangular frame shape, extending downward. An oil pan body 59 which is separate from the oil pan section 58 is joined to the lower portion of the oil pan section 58, thereby constituting the oil pan 60. The oil pan 60 reserves the oil flowing downward from the motor storage section 53 and the transmission storage section 54 which are located thereabove. As described above, the oil pan 60 has a rectangular parallelepiped shape which is elongated in the forward or rearward direction and extends from the motor storage section 53 to the transmission storage section 54. The oil pan 60 protrudes downward from the motor unit 5 with a less amount while ensuring a required volume.

In the present embodiment, the motor unit 5 includes the mechanical oil pump 61 and the electric oil pump 62 as an oil feeding source. The mechanical oil pump 61 and the electric oil pump 62 suction the oil reserved in the oil pan 60 via a common strainer 63, and discharge the oil. Specifically, for example, the strainer 63 is immersed in the reserved oil in the rear portion of the oil pan 60. The lower end of a first oil suction passage 64 extending vertically is connected to the upper end of the strainer 63.

With reference to FIGS. 3 and 6, the upper end of the first oil suction passage 64 is connected to a second oil suction passage 65 extending substantially horizontally and in the rightward or leftward direction, the right end of the second oil suction passage 65 is connected to a suction port 61a of the mechanical oil pump 61, and the left end of the second oil suction passage 65 is connected to a suction port 62a of the electric oil pump 62 via a third oil suction passage 66 extending in the forward or rearward direction. In other words, the mechanical oil pump 61 and the electric oil pump 62 are placed so as to face each other in the rightward or leftward direction, and the oil suction ports 61a, 62a of these pumps 61, 62 are connected to the common oil feeding passage (first oil suction passage 64).

The second oil suction passage 65 is, for example, a drill hole formed by drilling the case 51 of the motor unit 5 from a left side surface thereof toward a right region. The left end of the second oil suction passage 65 is closed by a plug 65a. The third oil suction passage 66 is a drill hole formed by drilling the case 51 from a rear surface thereof toward a front region. The front end of the third oil suction passage 66 is connected to the suction port of the electric oil pump 62, while the rear end thereof is closed by a plug 66a.

As shown in FIG. 4, when the interior of the case 51 of the motor unit 5 is viewed in a state in which the right wall member 55 is detached, the mechanical oil pump 61 is placed below the transmission storage section 54, and a pump drive gear 61c which is in mesh with a driven gear 61b is in mesh with a gear 43a (see FIG. 2) of a small diameter which is provided integrally with the clutch gear 43. In the present embodiment, the mechanical oil pump 61 is, for example, a trochoid pump, and its discharge rate increases in proportion to an increase in the rotational speed of the driving motor 30.

As shown in FIG. 5, the flange section of the electric oil pump 62 is fastened to the left side surface of the case 51 of the motor unit 5. As shown in FIG. 6, a cylindrical body 62b of the electric oil pump 62 is accommodated in a recess of the left side wall of the case 51. The electric motor (not shown) is incorporated into the body 62b, and operates in response to a control command issued by a controller 90 (see FIG. 7). A heat sink 62c is attached to the left end of the body 62b. A connector 62d of a signal line connecting the heat sink 62c and the controller 90 to each other is provided in a location which is obliquely rearward relative to the heat sink 62c.

Unlike the rotational speed of the mechanical oil pump 61, the rotational speed of the electric oil pump 62 can be controlled irrespective of the rotational speed of the driving motor 30. As will be described in detail, when the driving speed of the electric motorcycle 1 is relatively low and the rotational speed of the driving motor 30 is relatively low, the electric oil pump 62 is activated to compensate for an insufficiency of the discharge rate and discharge pressure of the oil discharged from the mechanical oil pump 61.

As shown in FIG. 6, the oil discharge port 61d of the mechanical oil pump 61 is in communication with a main oil passage 68 (common oil feeding passage) via a first oil discharge passage 67, while the oil discharge port 62e of the electric oil pump 62 is in communication with the main oil passage 68 via a second oil discharge passage 69. The main oil passage 68 is a drill hole formed by drilling the case 51 from its front surface toward a rear region. The first oil discharge passage 67 is connected to the rear end portion of the main oil passage 68 from a right side. The second oil discharge passage 69 is connected to a portion of the main oil passage 68 in a location which is a little forward relative to the location where the first oil discharge passage 67 is connected to the main oil passage 68, i.e., a downstream side in a flow direction of the oil.

The rear end of a metal-made pipe member 70 is connected to the front end of the main oil passage 68 which opens in the front surface of the case 51. The rear end portion of the pipe member 70 is attached to the front surface of the case 51 via a joint 70a. The front end of the pipe member 70 is connected to the rear end of a lower hose 71 in the vicinity of the rear end portion of a stay 29 supporting the lower portion of the oil cooler 28. The lower hose 71 has an elasticity like, for example, rubber. The lower hose 71 extends substantially forward, is curved in an obliquely rightward direction, and then is connected to the lower portion of the oil cooler 28 via a metal-made pipe member 72.

The pipe members 70, 72, the lower hose 71, the upper hose 79, and the return hose 80 constitute a cooling oil feeding passage used for feeding the oil from the main oil passage 68 to the driving motor 30 and the inverter 27 to cool the driving motor 30 and the inverter 27. In contrast, the case 51 of the motor unit 5 is provided with a transmission oil passage 73 which branches from the main oil passage 68 and is used for feeding the oil to the gear train 45 or the like of the transmission 40 to lubricate the gear train 45 or the like, and a motor oil passage 74 which branches from the main oil passage 68 like the transmission oil passage 73 and is used for lubricating the bearings 33 of the driving motor 30.

The transmission oil passage 73 includes a first transmission oil passage 73a which branches from the main oil passage 68 and extends upward, and a second transmission oil passage 73b connected to the upper end of the first transmission oil passage 73a. The lower end of the first transmission oil passage 73a is connected to a location where the second oil discharge passage 69 extending from the electric oil pump 62 is connected to the main oil passage 68. As shown in FIG. 2, the second transmission oil passage 73b extends leftward from the location where the second transmission oil passage 73b is connected to the first transmission oil passage 73a, and then is connected to a fifth transmission oil passage 73e extending axially inside the clutch shaft 41 via a third transmission oil passage 73c extending in the forward or rearward direction and a fourth transmission oil passage 73d extending in the rightward or leftward direction. Then, the oil is fed to the gear train 45 and the bearing 41a via a plurality of orifices extending radially outward from the fifth transmission oil passage 73e.

The first transmission oil passage 73a is connected to a sixth transmission oil passage 73f inside the output shaft 44 of the transmission 40 via an oil passage (not shown). The oil is fed to the gear train 45 and a bearing 44a via a plurality of orifices extending radially outward from the sixth transmission oil passage 73f extending axially inside the output shaft 44. As should be understood from this, the transmission oil passage 73 used for feeding the oil to the gear train 45 and the bearings 41a, 44a has a relatively intricate structure, and a great pressure loss tends to be generated there.

The motor oil passage 74 includes a first motor oil passage 74a which branches from the main oil passage 68 at a location which is below the motor storage section 53, i.e., in a forward region of the case 51 of the motor unit 5 (downstream of the transmission oil passage 73 in the flow direction of the oil), and extends in the rightward or leftward direction, and second and third motor oil passages 74b, 74c extending from left and right ends of the first motor oil passage 74a, respectively, toward the motor shaft 32 of the first driving motor 30.

Specifically, as indicated by a solid line in FIG. 2 and a virtual line in FIG. 3, the second and third motor oil passages 74b, 74c are formed in the bottom wall portion 31a of the motor case 31 and the cap 34, respectively, and their inner ends are connected to the bearings 33 to feed the oil to the bearings 33, respectively, while the outer ends of the second and third motor oil passages 74b, 74c are connected to the left and right ends of the first motor oil passage 74a via ports 75a, 76a formed in joint members 75, 76, respectively.

As shown in FIG. 2, a hydraulic sensor 77 is connected to the first motor oil passage 74a via a branch passage 74d. The hydraulic sensor 77 outputs a signal to the controller 90. An oil pressure in the first motor oil passage 74a is substantially equal to a pressure of the oil fed to the bearings 33 of the driving motor 30. By detecting the value of the oil pressure in the first motor oil passage 74a and controlling the operation of the electric oil pump 62, a desired state in which the oil is fed to the components of the motor unit 5 can be maintained.

As shown in FIG. 3, a relief valve 78 is provided between the transmission oil passage 73 and the motor oil passage 74 which branch from the main oil passage 68. The relief valve 78 is normally placed in a closed state in which a ball 78b stored in a tubular housing 78a is pushed against a seat section 78d located thereabove by a force applied by a coil spring 78c. When the oil pressure in the main oil passage 68 increases up to a predetermined value or greater, the ball 78b receives this oil pressure and moves downward while pushing the coil spring 78c such that the coil spring 78c is contracted, moves away from the seat section 78d, and is placed in an open state to release the oil pressure in the main oil passage 68.

As described with reference to FIG. 1, in the present embodiment, the oil used for lubricating the driving motor 30 and the transmission 40 is utilized to cool the stator 36 of the driving motor 30 and the inverter 27 which generate heat during the operation. Specifically, a part of the oil flowing through the main oil passage 68 is sent to the oil cooler 28 via the pipe members 70, 72 and the lower hose 71. While the oil is flowing upward in the core of the oil cooler 28, it radiates heat by heat exchange with the ram air.

As schematically shown in FIG. 3, the upper hose 79 is provided and connected between the upper portion of the oil cooler 28 and the inverter case 26 placed behind the oil cooler 28. The return hose 80 is provided and connected between the inverter case 26 and the motor unit 5 (see FIG. 1 in addition to FIG. 3). The lower end of the return hose 80 is connected to the upper portion of the case 51 of the motor unit 5 via a joint (not shown) or the like. The oil which has cooled the inverter 27 is returned to the case 51 of the motor unit 5 via the return hose 80.

As described above, in the motor unit 5 of the present embodiment, by utilizing a double-wall structure in which the motor case 31 is fitted into the motor storage section 53 of the case 51, the cooling jacket 31c is formed between the motor storage section 53 and the peripheral wall 31b of the motor case 31 such that the cooling jacket 31c surrounds the stator 36. Specifically, a shallow groove with a rectangular cross-section is formed so as to extend over the entire outer periphery of the peripheral wall 31b of the motor case 31 in a range from a substantially center portion in the rightward or leftward direction to a slightly rightward region, a thinned portion is formed in the inner peripheral surface of the motor storage section 53 surrounding the groove, and the cooling jacket 31c of an annular shape is formed between the groove and the thinned portion.

As shown in FIG. 2, a plurality of (five in the example of FIG. 2) annular deep grooves with a small width are formed in the shallow groove of the peripheral wall 31b of the motor case 31 which faces the cooling jacket 31c. This can improve the efficiency with which the stator 36 is cooled by the oil. The oil flowing downward through the return hose 80 as described above flows into the cooling jacket 31c from above, is divided to flow in a circumferential direction, and then flows along the outer periphery of the motor case 31 as indicated by arrows of FIG. 3. While flowing downward through the cooling jacket 31c, the oil deprives heat from the driving motor 30 and falls downward into the oil pan 60 located therebelow, through an oil discharge port 53a at the lower portion of the motor storage section 53.

Control System of Electric Oil Pump

As described above, the discharge rate of the mechanical oil pump 61 increases in proportion to the increase in the rotational speed of the driving motor 30. Therefore, when the rotational speed of the driving motor 30 is low, the discharge rate tends to be insufficient, while when the rotational speed of the driving motor 30 is high, the discharge rate tends to be excessive. In view of this, in the present embodiment, to compensate for such an oil discharge characteristic of the mechanical oil pump 61, the electric oil pump 62 is operated.

Figure 7:
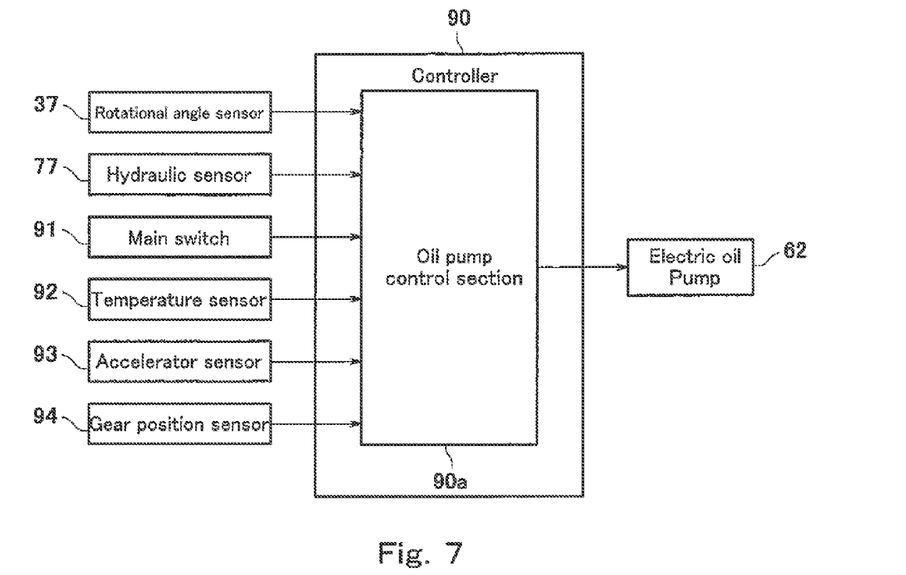
FIG. 7 is a functional block diagram of a control system of the electric oil pump.

FIG. 7 is a functional block diagram of the control system of the electric oil pump 62. In the present embodiment, the controller 90 for controlling the operation of the driving motor 30 includes an oil pump control section 90a for controlling the operation of the electric oil pump 62. The oil pump control section 90a receives as inputs signals from at least the rotational angle sensor 37 of the driving motor 30 and the hydraulic sensor 77. In addition, the oil pump control section 90a receives as inputs signals from a main switch 91 of the electric motorcycle 1, a temperature sensor 92 for detecting a temperature state of the driving motor 30, an accelerator sensor 93 for detecting a displacement amount of the accelerator grip of the electric motorcycle 1, a gear position sensor 94 for detecting a gear position, and other sensors.

In response to these signals, the oil pump control section 90a firstly controls the electric oil pump 62 such that it initiates the operation, before the operation of the driving motor 30 is initiated under a specified condition, for example, when the electric motorcycle 1 is starting. Also, the oil pump control section 90a operates the electric oil pump 62 in a low rotational speed range of the driving motor 30, in which the discharge rate or the like of the mechanical oil pump 61 tends to be insufficient. The oil pump control section 90a is implemented in such a way that a microcomputer of the controller 90 executes software processing.

Figure 8:
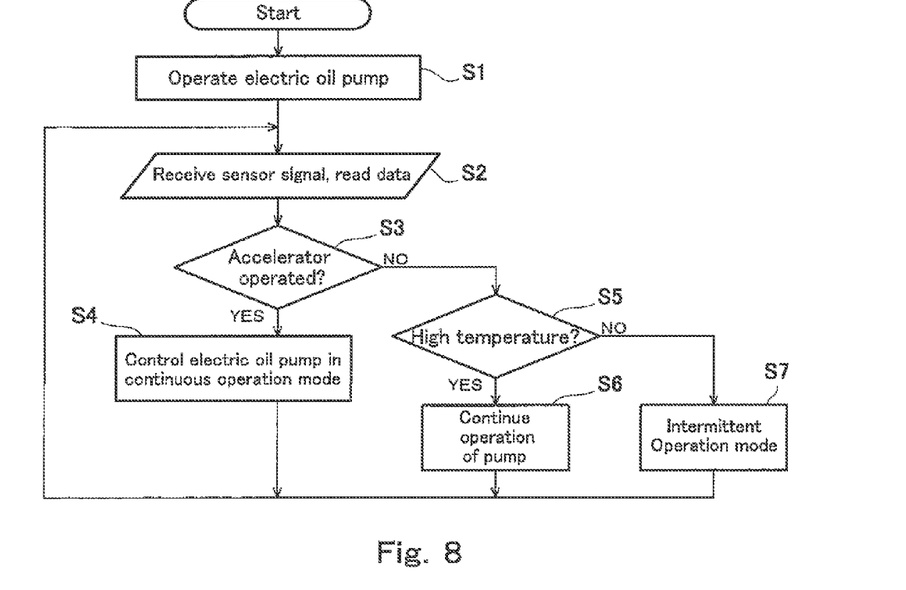
FIG. 8 is a flowchart showing a procedure of control for the operation of the electric oil pump.
Figure 9:
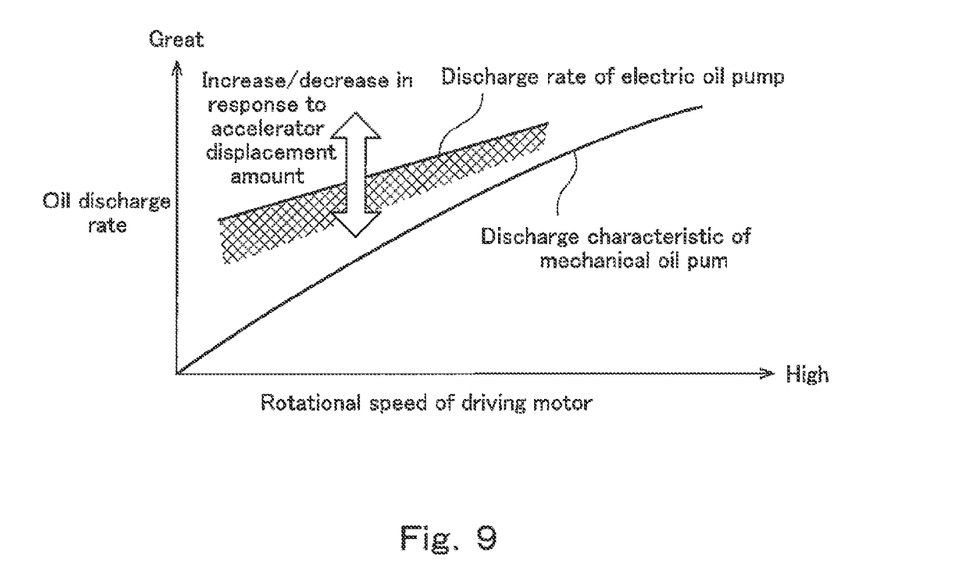
FIG. 9 is a view showing that a discharge characteristic of a mechanical oil pump is compensated by the operation of the electric oil pump.

Hereinafter, with reference to FIGS. 8 and 9, the above described control for the operation of the electric oil pump 62 will be specifically described. FIG. 8 is a flowchart showing a procedure of control for the operation of the electric oil pump 62. FIG. 9 is a view showing that the discharge characteristic of the mechanical oil pump 61 is compensated by the operation of the electric oil pump 62.

When the main switch 91 of the electric motorcycle 1 is turned ON (changed from OFF to ON), the flow of FIG. 8 starts. Initially, in step S1, the oil pump control section 90a of the controller 90 sends an operation command to the electric oil pump 62. Receiving this operation command, the electric oil pump 62 operates for a preset time (e.g., about 5 to 10 seconds) and sends out the oil to the main oil passage 68. A part of the oil sent out to the main oil passage 68 in this way is fed to the oil cooler 28 via the lower hose 71, to cool the inverter 27 and the driving motor 30. During a stopped state, the driving motor 30 and the inverter 27 generate less heat. Therefore, the rotational speed of the electric oil pump 62 is controlled to be low to avoid wasteful electric power consumption.

A part of the oil sent out to the main oil passage 68 is fed to the transmission 40 through the transmission oil passage 73 to lubricate the gear train 45, and the bearings 41a, 44a. In the same manner, the oil flowing from the main oil passage 68 to the motor oil passage 74 is fed to the driving motor 30, to lubricate the bearings 33. In this way, for some time, an oil film is formed on the components to be lubricated by the oil fed to the components, and a state in which there is no lubrication oil does not occur.

In this state, the oil pump control section 90a receives as inputs the signals from the above stated sensors, and reads data from a specified area of the memory of the controller 90 (step S2). The oil pump control section 90a determines whether or not the accelerator grip is operated (step S3). When the oil pump control section 90a determines that the accelerator grip is not operated and a result of the determination is NO, it moves to step S5 as will be described later. On the other hand, when the oil pump control section 90a determines that the accelerator grip is operated and a result of the determination is YES, it controls the operation of the electric oil pump 62 according to the displacement amount or the like of the accelerator grip (step S4: continuous operation mode).

For example, at the starting of the electric motorcycle 1, the driving motor 30 initiates its rotation in response to the rider's operation of the accelerator grip, and generates relatively great torque. At this time, as described above, the oil has already been fed to the components to be lubricated, such as the bearings 33 of the driving motor 30, the gear train 45 of the transmission 40, and the bearings 41a, 44a of the transmission 40. Therefore, a problem that these components are damaged due to the absence of the lubrication oil does not occur.

Then, the electric motorcycle 1 initiates driving. The rotational speed of the driving motor 30 is controlled in response to the rider's operation of the accelerator grip, and the discharge rate of the oil discharged from the mechanical oil pump 61 which rotates in proportion to the rotational speed of the driving motor 30 changes correspondingly. In a case where the driving speed of the electric motorcycle 1 is low and the rotational speed of the driving motor 30 is relatively low, the discharge rate and discharge pressure of the oil discharged from the mechanical oil pump 61 tend to be insufficient. To compensate for this, the operation of the electric oil pump 62 is controlled.

Specifically, for example, as schematically shown in FIG. 9, the rotational speed of the electric oil pump 62 in the continuous operation mode basically changes according to the rotational speed of the driving motor 30 and the displacement amount of the accelerator grip. When the rotational speed of the driving motor 30 is low, the oil fed to the components to be lubricated such as the transmission 40 becomes insufficient, by the operation of the mechanical oil pump 61 alone. To compensate for this, the electric oil pump 62 is operated in such a manner that as the rotational speed of the driving motor 30 is higher, the rotational speed of the electric oil pump 62 decreases.

In contrast, when the displacement amount of the accelerator grip is great, the driving power output of the driving motor 30 increases. In order to ensure that the oil is fed to the components to be lubricated, such as the bearings of the driving motor 30 and the transmission 40, and increase the flow rate of the oil used for cooling the driving motor 30, and the inverter 27, the rotational speed of the electric oil pump 62 is increased. In this way, the electric oil pump 62 may be controlled based on the signals from the hydraulic sensor 77, the temperature sensor 92, the gear position sensor 94, and the like as well as the rotational speed of the driving motor 30 and the displacement amount of the accelerator grip.

At a time point when the discharge rate and discharge pressure of the oil discharged from the mechanical oil pump 61 have increased with the increase in the rotational speed of the driving motor 30, the operation of the electric oil pump 62 may be stopped correspondingly. Especially, in a high rotational speed range of the driving motor 30, the discharge rate of the oil discharged from the mechanical oil pump 61 tends to be excessive, so that the relief valve 78 is operated.

By appropriately operating the electric oil pump 62 in addition to the operation of the mechanical oil pump 61, the oil is sent out in a sufficient amount to the main oil passage 68 and used for lubricating the gear train 45 and the bearings 41a, 44a of the transmission 40, the bearings 33 of the driving motor 30, and other components. In the present embodiment, since the transmission oil passage 73 and the motor oil passage 74 branch from the main oil passage 68, and there is no pressure loss in the oil cooler 28, the oil with a high pressure can be fed to the components to be lubricated, such as the transmission 40 and the driving motor 30.

The transmission oil passage 73 used for feeding the oil to the gear train 45 or the like of the transmission 40 has a relatively intricate structure, and a great pressure loss is likely to be generated there. In light of this, in the present embodiment, the transmission oil passage 73 branches from the main oil passage 68 in a location which is upstream of the motor oil passage 74 in the oil flow direction, i.e., near the oil pumps 61, 62. This makes it possible to easily ensure a required oil pressure in the transmission oil passage 73 in which the pressure loss tends to increase.

A part of the oil sent out to the main oil passage 68 is fed to the oil cooler 28 via the lower hose 71 and thereafter is used for cooling the inverter 27 and the driving motor 30. The oil with a relatively low temperature, which has radiated heat in the oil cooler 28, can effectively cool the inverter 27 and the driving motor 30.

In contrast to the above described continuous operation mode, when the oil pump control section 90a determines that the accelerator grip is not operated and a result of the determination is NO in step S2, it determines whether or not the driving motor 30 or the inverter 27 is in a high-temperature state in which its temperature is equal to or higher than a predetermined value, based on the signal from the temperature sensor 92 in step S5. If a result of this determination is YES, the temperature of the driving motor 30 or the like is high even though the accelerator grip is not operated. Therefore, the oil pump control section 90a determines that the driving motor 30 or the inverter 27 is in an excessive heat state, for example, just after driving under a high load, and continues the operation of the electric oil pump 62 for a preset period (step S6).

On the other hand, when the oil pump control section 90a determines that the temperature of the driving motor 30 and the temperature of the inverter 27 are lower than the predetermined value (NO in step S5), it deactivates the electric oil pump 62 once, then causes the electric oil pump 62 to operate intermittently (intermittent operation mode), and returns to step S2. In the intermittent operation mode, the electric oil pump 62 is deactivated for a predetermined period (e.g., about five to ten minutes), and thereafter is operated for a set time (e.g., about 10 to 30 seconds), which are repeated alternately. When the main switch 91 is turned OFF, the control flow is forcibly terminated.

As should be understood from the above, the motor unit 5 of the electric motorcycle 1 according to the present embodiment includes the electric oil pump 62 in addition to the mechanical oil pump 61 activated by the driving motor 30, and the electric oil pump 62 is operated as necessary before the electric motorcycle 1 is started. This makes it possible to prevent a situation in which there is no lubrication oil in the components to be lubricated such as the transmission 40 and the driving motor 30, and thereby these components are damaged, during starting.

When the main switch 91 of the electric motorcycle 1 is turned ON (changed from OFF to ON), there is a possibility that there was a long-time stop before the main switch 91 is turned ON. Therefore, the electric oil pump 62 is operated without fail. If the driving motor 30 is deactivated in a state in which the main switch 91 is ON, the electric oil pump 62 is operated intermittently. This makes it possible to prevent a situation in which there is no lubrication oil in the components to be lubricated such as the transmission 40 and the driving motor 30, during starting, even after the rider forgot to turn OFF the main switch 91.

Furthermore, in the present embodiment, during driving of the electric motorcycle 1, the operation of the electric oil pump 62 is controlled to compensate for the discharge characteristic of the mechanical oil pump 61. Thus, a pump drive loss can be reduced in the high rotational speed range while avoiding that the discharge rate and discharge pressure of the oil become insufficient in the low rotational speed range.

Moreover, in the present embodiment, the oil discharge port 61*d* of the mechanical oil pump 61 and the oil discharge port 62*e* of the electric oil pump 62 are connected to the common main oil passage 68 via the first oil discharge passage 67 and the second oil discharge passage 69, respectively. This can simplify the overall construction of the oil passages and reduce the number of steps.

Other Embodiments

The above description of the embodiment is merely exemplary, and is in no way intended to limit the present invention, applications and uses of the present invention. For example, the above described overall structure of the oil passages in the above embodiment is merely exemplary, and a different oil passage structure may be used. For example, the oil pumps 61, 62 may not be connected to the common main oil passage 68. Or, the transmission oil passage 73 may not branch from the main oil passage 68 at a relatively upstream side, or the motor oil passage 74 may not branch from the main oil passage 68 at a relatively downstream side.

Although in the above described embodiment, the operation of the electric oil pump 62 is initiated when the main switch 91 of the electric motorcycle 1 is turned ON, the present invention is not limited to this. For example, in the case of an electric vehicle incorporating a keyless system, when a rider carrying a remote controller key straddles the seat and a signal is output from a seating sensor, for example, in a state in which the main switch is OFF, the operation of the electric oil pump 62 may be initiated.

In the above described embodiment, when the main switch 91 is ON and the accelerator grip is not operated, the electric oil pump 62 is operated in the intermittent operation mode, if the temperature is not high. However, the electric oil pump 62 may be deactivated at this time. Nonetheless, in this case, it is desirable to initiate the operation of the electric oil pump 62 in response to a rider's operation after the electric oil pump 62 is deactivated.

Figure 10:
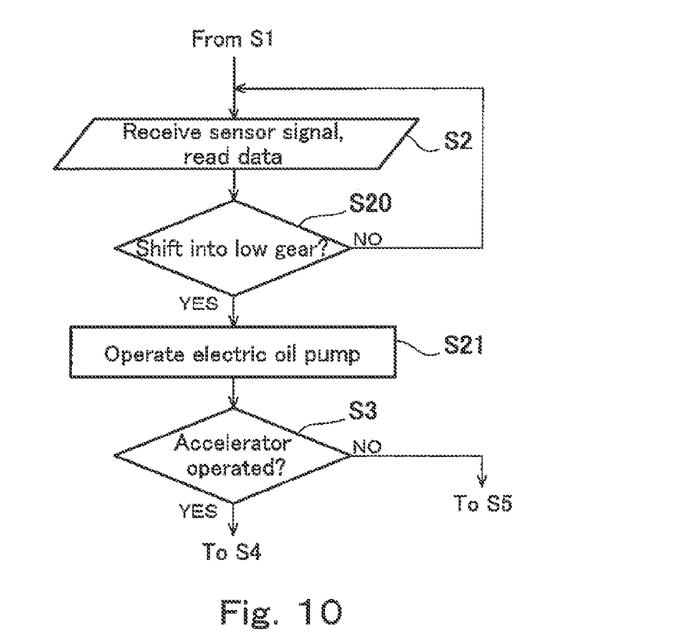
FIG. 10 is a view corresponding to FIG. 8, according to another embodiment in which there is no intermittent operation mode.

As shown in FIG. 10, for example, in step S20 which is subsequent to step S2 in the above described flow of FIG. 8, the oil pump control section 90*a* determines whether or not the transmission 40 has been shifted from a neutral position into low gear (shifted into low gear?) based on the signal from the gear position sensor 94. When the oil pump control section 90*a* determines that the transmission 40 has not been shifted (NO), it stands by. On the other hand, when the oil pump control section 90*a* determines that the transmission 40 has been shifted (YES), it operates the electric oil pump 62 (step S21). This makes it possible to prevent a situation in which there is no lubrication oil in the components to be lubricated such as the transmission 40 and the driving motor 30, during starting of the electric motorcycle 1, after the electric oil pump 62 is operated.

Instead of operating the electric oil pump 62 in response to the signal from the gear position sensor 94 as described above, the electric oil pump 62 may be operated in response to the signal from an accelerator grip pressure-sensitive sensor or a clutch sensor if these sensors are mounted in the electric motorcycle 1, although they are not shown.

Although in the above described embodiment, the electric motorcycle 1 has been described, the electric vehicle of the present invention is not limited to the two-wheeled vehicle, but may be, for example, an ATV (all terrain vehicle), a small truck, etc. Of course, a hybrid electric vehicle incorporating an engine in addition to the driving motor 30 as a driving power source may be included in the electric vehicle of the present invention.

INDUSTRIAL APPLICABILITY

As described above, the electric vehicle of the present invention is capable of preventing a situation in which there is no lubrication oil in the driving power transmission mechanism during starting, resolving an insufficient state of the oil in the low rotational speed range, and reducing a pump drive loss in the high rotational speed range. Therefore, the electric vehicle of the present invention can be effectively used.

REFERENCE CHARACTER LIST

1 electric motorcycle (electric vehicle)
5 motor unit
30 driving motor (electric motor for moving vehicle body)
40 transmission (driving power transmission mechanism)
61 mechanical oil pump (oil feeding source)
61*d* oil discharge port
62 electric oil pump (oil feeding source)
62*e* oil discharge port
68 main oil passage (common oil feeding passage)
70, 72 pipe member (cooling oil feeding passage)
71 lower hose (cooling oil feeding passage)
79 upper hose (cooling oil feeding passage)
90 controller
90*a* oil pump control section

The invention claimed is:

1. An electric vehicle comprising:
an electric motor which activates a wheel via a driving power transmission mechanism to move a vehicle body;
a mechanical oil pump which is mechanically activated by the electric motor to feed oil to the driving power transmission mechanism;
an electric oil pump which feeds the oil to the driving power transmission mechanism; and
a controller which controls the electric oil pump such that the electric oil pump in a deactivated state initiates its operation, before the electric motor in a deactivated state initiates its operation under a specified condition,
wherein the controller controls the electric oil pump in such a manner that a rotational speed of the electric oil pump is set according to a displacement amount of an accelerator.

2. The electric vehicle according to claim 1, wherein the controller activates the electric oil pump when a driving speed or a rotational speed of the electric motor for moving the vehicle body is low; and
wherein the controller deactivates the electric oil pump when the driving speed or the rotational speed of the electric motor for moving the vehicle body is high.

3. The electric vehicle according to claim 1, wherein the controller decreases a rotational speed of the electric oil pump as a rotational speed of the electric motor for moving the vehicle body is higher.

4. The electric vehicle according to claim 1, wherein the motor unit generating heat during an operation is cooled by heat exchange with the oil; and
wherein the controller continues to operate the electric oil pump for a predetermined period, when a temperature of the motor unit generating heat is equal to or higher than a predetermined value based on a signal from a temperature sensor which detects a temperature state of the electric motor.

5. The electric vehicle according to claim 1, wherein the controller sets the rotational speed of the electric oil pump higher, as the displacement amount of the accelerator is greater.

6. The electronic vehicle according to claim 1, wherein the controller sets the rotational speed of the electric oil pump lower, as the displacement amount of the accelerator is smaller.

7. The electric vehicle according to claim 1, wherein the controller controls the electric oil pump in such a manner that the rotational speed of the electric pump is set higher according to an increase in the displacement amount of the accelerator and is set lower according to a decrease in the displacement amount of the accelerator.

8. The electric vehicle according to claim 1, wherein the controller sets the rotational speed of the electric oil pump based on a rotational speed of the electric motor or a driving speed of the electric vehicle.

9. The electric vehicle according to claim 1, wherein the controller controls the electric oil pump in such a manner that the electric oil pump performs an intermittent operation in which activation of the electric oil pump and deactivation of the electric oil pump are repeated alternately, irrespective of the displacement amount of the accelerator, when a temperature of the electric motor and a temperature of an electric drive circuit of the electric motor are lower than a predetermined value.

* * * * *